8173X

PATENTED APR. 28, 1834.

E. WHITMAN.

ROASTING JACK.

THE NORRIS PETERS CO., WASHINGTON, D. C.

Ezra Whitman Jr.

Machine for turning meat and Coffee, while roasting called Whitman's roasting Jack The schedule referred to in these Letters Patent, and making part of the same, containing a discription in the words of the said Ezra Whitman Junr. himself of his Improvement in the machine for turning meat & coffee while roasting, called Whitman's Roasting Jack –

---

Figure 2:
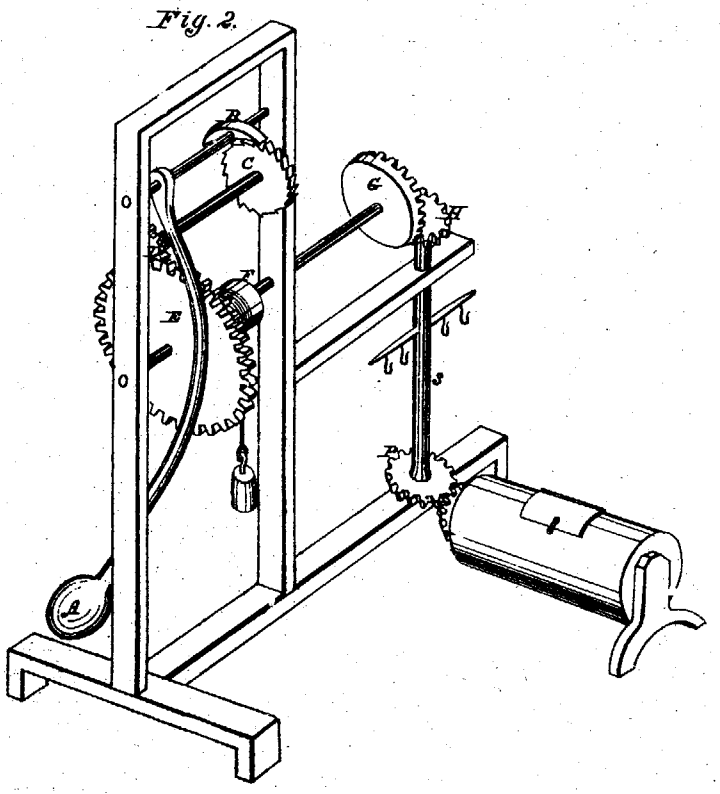
Figure 1:
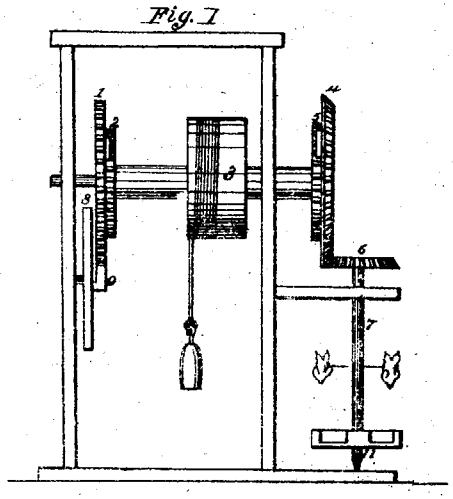

To all persons to whom these Presents shall come, Ezra Whitman Jr. of Winthrop County of Kennebec & State of Maine sends greeting – Be it Known, that I the said Ezra Whitman Jr. have invented, constructed & applied to use a new & useful improvement in the machine for turning meat & Coffee while roasting, called, Whitman's roasting Jack specified in the words following to wit. Reference being had to the drawings Fig. 1. Plate 1. is a toothed wheel on a horizontal shaft attached to this same shaft, is the ratchet wheel 2. which has a click attached to the wheel 1. as in similar wheels in clockwork. 3 is an arbor or small drum over which passes a line attached to a weight as in clocks ——

On the same shaft is another ratchet wheel 5. with its click attached to 4. The wheel No. 4 is bevelled & drives the horizontal pinion 6 – To this pinion is attached the upright or vertical spit No. 7.

On the back side of the frame is another wheel which I call a balance wheel having an escapement 9 at its centre which plays into the teeth of No. 1.... The spit is perforated with holes, thro which are thrust shorter horizontal spits armed sometimes with hooks upon which may be hung such things as are requested to be roasted, or they may be run thro and fastened to the upright spit, in that manner a pair is also made thro which the upright spit passes, & may slide up & down it,. this pair is represented at No. 11.

this however is not necessary, as a common pair may be set under in order to catch the gravy.

I also attach more than one upright spit when necessary, ~~as a common pair may be set under in order to catch the gravy~~ by extending a cross piece from the foot of the machine into which the foot of each upright spit may be inserted & to carry them; spur or cog wheels may be fastened at the tops & motion communicated from No. 7. to the others, a bright tin reflector may be attached to the post No. 12. which much facilitates the roasting.

In order to roast coffee, a bevel pinion is fastened to the bottom of the upright spit, another bevel pinion is attached to the gudgeon of a common cylindrical coffee roaster which matches into each other, a socket is made in the bottompiece & the gudgeon of the Coffee roaster is made with a bulge or projection in order to prevent its slipping out – This coffee roaster is shown attached in Plate 2.

In order to put this machine in motion after the meat is put upon the spit, the machine is wound up by means of the crank or by means of a rod click put into a hole of the barrel or arbor No. 3. The weight there begins to descend and turns the shaft and the wheel 1 & 4 and consequently the spit 7. The balance wheel No. 8 with its escapement 9 regulates the movement and causes it to move uniformly while the weight is standing. This regularity of movement may be effected by means of a pendulum and on the whole, the Pendulum is somewhat preferable.

Plate II represents the roaster with the pendulum; A. is the pendulum B the escapement C the ratchet wheel D a pinion E large wheel matching into the pinion D – F the arbor or Barrel. G a bevel – H a pinion on the top of the spit S the spit P a pinion at the bottom of the spit connected with the pinion of the Coffee roaster – with the weight Claims – That I specifically claim as my invention and for which I desire an exclusive right – is 1st The combination of machinery as above specified, to turn meat or coffee while roasting, & particularly 2d The using of one or more upright spits as above specified or 3d. The ~~hori~~ ad-dition & application ~~zontal shaft put in motion~~ of the coffeeroaster as above specified In testimony ~~that the above is~~ a true specification of my said Improvement I have hereunto set my hand this 14th. day of April 1834.

Witnesses
G. A Benson
P. Benson Jr

Ezra Whitman Jr

Exd. [illegible]

910 words (Patented April 28. 1834.)

Drawing

Drawing made